US 7,710,427 B1

(12) United States Patent
Hutchins et al.

(10) Patent No.: US 7,710,427 B1
(45) Date of Patent: May 4, 2010

(54) ARITHMETIC LOGIC UNIT AND METHOD FOR PROCESSING DATA IN A GRAPHICS PIPELINE

(75) Inventors: Edward A. Hutchins, Mountain View, CA (US); Brian K. Angell, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 3 days.

(21) Appl. No.: 10/846,728

(22) Filed: May 14, 2004

(51) Int. Cl.
G09G 5/37 (2006.01)
G06T 1/20 (2006.01)
G06F 15/16 (2006.01)

(52) U.S. Cl. .................. 345/561; 345/506; 345/502

(58) Field of Classification Search ......... 345/501–506, 345/522, 559, 561, 530, 418; 708/490, 521; 712/221
See application file for complete search history.

(56) References Cited

U.S. PATENT DOCUMENTS

| | | | |
|---|---|---|---|
| 4,620,217 A | | 10/1986 | Songer |
| 4,648,045 A | * | 3/1987 | Demetrescu ................. 345/505 |
| 4,700,319 A | | 10/1987 | Steiner |
| 4,901,224 A | | 2/1990 | Ewert |
| 5,185,856 A | * | 2/1993 | Alcorn et al. ................ 345/561 |
| 5,357,604 A | * | 10/1994 | San et al. ...................... 463/31 |
| 5,491,496 A | | 2/1996 | Tomiyasu |
| 5,977,977 A | * | 11/1999 | Kajiya et al. ................. 345/418 |
| 6,118,452 A | * | 9/2000 | Gannett ....................... 345/418 |
| 6,173,366 B1 | | 1/2001 | Thayer et al. |
| 6,333,744 B1 | * | 12/2001 | Kirk et al. .................... 345/506 |
| 6,353,439 B1 | * | 3/2002 | Lindholm et al. ........... 345/561 |
| 6,466,222 B1 | | 10/2002 | Kao et al. |
| 6,496,537 B1 | | 12/2002 | Kranawetter et al. |
| 6,624,818 B1 | * | 9/2003 | Mantor et al. ............... 345/522 |
| 6,636,221 B1 | | 10/2003 | Morein |
| 6,924,808 B2 | * | 8/2005 | Kurihara et al. ............. 345/506 |
| 6,947,053 B2 | * | 9/2005 | Malka et al. ................. 345/582 |
| 7,298,375 B1 | | 11/2007 | Hutchins |
| 2004/0114813 A1 | * | 6/2004 | Boliek et al. ................. 382/233 |

OTHER PUBLICATIONS

"Intervealed Memory" http://www.webopedia.com/TERM/1/intervealed_memory.html.
Pirazzi,Chris. "Fields, F1/F2, Interleave, Field Dominance And More." http://www.lurkertech.com/lg/domincance.html.
Notice of Allowance Dated Sep. 14, 2009; U.S. Appl. No. 11/973,738.
Final Office Action Dated Mar. 30, 2009; U.S. Appl. No. 11/973,738.
Non-Final Office Action Dated Sep. 11, 2008; U.S. Appl. No. 11/973,738.

* cited by examiner

Primary Examiner—Joni Hsu

(57) ABSTRACT

Embodiments of the present invention include an arithmetic logic unit for use in a graphics pipeline. The arithmetic logic unit comprising a plurality of scalar arithmetic logic subunits wherein each subunit performs a resultant arithmetic logic operation in the form of [a*b "op" c*d] on a set of input operands a, b, c and d. The arithmetic logic unit also for produces a result based thereon wherein "op" represents a programmable operation and wherein further the resultant arithmetic logic operation is software programmable to implement a plurality of different graphics functions.

39 Claims, 15 Drawing Sheets

434

600

GENERATING A FIRST SET OF PIXEL DATA, THE FIRST SET OF PIXEL DATA COMPRISING PAYLOAD INFORMATION COMPRISING A PLURALITY OF SCALAR PIXEL ATTRIBUTE VALUES AND SIDEBAND INFORMATION COMPRISING A PROCESSING SEQUENCE IDENTIFIER CORRESPONDING TO A SOFTWARE PROGRAMMABLE INSTRUCTION FOR A FIRST OPERATION TO BE PERFORMED.
610

SENDING THE FIRST SET OF PIXEL DATA TO AN ARITHMETIC LOGIC UNIT (ALU) STAGE COMPRISING A PLURALITY OF SCALAR ALUs FOR PROCESSING THE FIRST SET OF PIXEL DATA BASED ON THE INSTRUCTION.
615

SELECTING A SET OF OPERANDS TO BE PROCESSED AT A FIRST ARITHMETIC LOGIC UNIT.
620

SELECTING A NEGATIVE VALUE OR A COMPLEMENT VALUE OF AN OPERAND VALUE.
625

PROCESSING THE OPERANDS AND GENERATING A RESULT VALUE
630

CLAMPING THE RESULT VALUE
635

SENDING THE RESULT VALUE TO A TEMPORARY REGISTER ACCESSIBLE BY THE FIRST ALU.
640

SENDING THE RESULT VALUE TO A SECOND ARITHMETIC LOGIC UNIT OR TO A FOLLOWING GRAPHICS PIPELINE STAGE.
645

FIGURE 6

| P1.N.0 | P1.N.1 | P1.N.2 | P1.N.3 | | PIXEL 1 ROW N |
| | P0.N.0 | P0.N.1 | P0.N.2 | P0.N.3 | PIXEL 0 ROW N |

| P1.2.0 | P1.2.1 | P1.2.2 | P1.2.3 | | PIXEL 1 ROW 2 |
| | P0.2.0 | P0.2.1 | P0.2.2 | P0.2.3 | PIXEL 0 ROW 2 |
| P1.1.0 | P1.1.1 | P1.1.2 | P1.1.3 | | PIXEL 1 ROW 1 |
| | P0.1.0 | P0.1.1 | P0.1.2 | P0.1.3 | PIXEL 0 ROW 1 |
| P1.0.0 | P1.0.1 | P1.0.2 | P1.0.3 | | PIXEL 1 ROW 0 |
| | P0.0.0 | P0.0.1 | P0.0.2 | P0.0.3 | PIXEL 0 ROW 0 |

FIGURE 7

ARITHMETIC LOGIC UNIT AND METHOD FOR PROCESSING DATA IN A GRAPHICS PIPELINE

CROSS REFERENCES TO RELATED APPLICATIONS

This application is related to U.S. patent application Ser. No. 10/846,788 by E. Hutchins et al., filed on May 14, 2004, entitled "Arithmetic Logic Unit Temporary Registers," with assigned to the assignee of the present invention, and hereby incorporated by reference in its entirety.

This application is related to U.S. patent application Ser. No. 10/846,821 by E. Hutchins et al., filed on May 14, 2004, entitled "Arithmetic Logic Units in Series in a Graphics Pipeline," assigned to the assignee of the present invention, and hereby incorporated by reference in its entirety.

FIELD OF THE INVENTION

The present invention is generally related to processors. More particularly, embodiments of the present invention are directed towards low power processors used in, for example, graphics applications.

BACKGROUND ART

The generation of three-dimensional graphical images is of interest in a variety of electronic games and other applications. Computer graphics generally consists of instructions implemented via a graphics processing unit (GPU) executed on a computer system. The GPU can be envisioned as a pipeline through which pixel data pass. The data are used to define the image to be produced and displayed. The instructions are used to specify the calculations and operations needed to modify the data to produce rendered images that have a three-dimensional appearance.

In the initial stages of the pipeline, the desired image is composed using geometric shapes referred to as geometric primitives. In subsequent stages, effects such as texture, fog, and shading are added in order to enhance the realism of the image, and anti-aliasing and blending functions are also applied so that the rendered image will have a smoother and more realistic appearance. The results of the pipeline operations are stored in the frame buffer as pixels. The pixel values can be later read from the frame buffer and used to generate a display on a computer screen.

FIG. 1 illustrates one example of a conventional pipeline architecture, which is a "deep" pipeline having stages dedicated to performing specific functions. A transform stage 105 performs geometrical calculations of primitives and may also perform a clipping operation. A setup/raster stage 110 rasterizes the primitives. A texture address 115 stage and texture fetch 120 stage are utilized for texture mapping. A fog stage 130 implements a fog algorithm. An alpha test stage 135 performs an alpha test. A depth test 140 performs a depth test for culling occluded pixels. An alpha-blend stage 145 performs an alpha-blend color combination algorithm. A memory write stage 150 writes the output of the pipeline to memory.

There is an increasing interest in rendering three-dimensional graphical images in wireless phones, personal digital assistants (PDAs), and other devices where cost and power consumption are important design considerations. However, the conventional deep pipeline architecture requires a significant chip area, resulting in greater cost than desired. Additionally, a deep pipeline consumes significant power. As a result of cost and power considerations, the conventional deep pipeline architecture illustrated in FIG. 1 is considered unsuitable for wireless phones, PDAs and other such devices.

SUMMARY OF THE INVENTION

Therefore, a processor architecture suitable for graphics processing applications but with reduced power and size requirements would be advantageous. Embodiments in accordance with the present invention provide this and other advantages.

Embodiments of the present invention include an arithmetic logic unit for use in a graphics pipeline. The arithmetic logic unit comprising a plurality of scalar arithmetic logic subunits wherein each subunit performs a resultant arithmetic logic operation in the form of [a*b "op" c*d] on a set of input operands a, b, c and d. The arithmetic logic unit also for produces a result based thereon wherein "op" represents a programmable operation and wherein further the resultant arithmetic logic operation is software programmable to implement a plurality of different graphics functions.

In one embodiment of the invention, the plurality of different graphics functions comprise a fog operation; an alpha blend operation; an alpha test operation; and a texture combine operation. The arithmetic logic unit of the present invention can simultaneously perform different operations therefore optimizing the arithmetic logic unit functionality and decreasing power consumption compared to conventional arithmetic logic units of a conventional graphics processor.

Embodiments of the present invention also include an arithmetic logic unit for graphics processing comprising a graphics pipeline register for storing incoming pixel data, wherein the incoming pixel data comprises a plurality of scalar pixel attribute values and a processing sequence identifier corresponding to a software programmable instruction for performing an arithmetic operation on a plurality of scalar operand values selected from the incoming pixel data. The arithmetic logic unit further comprises a first data selector for selecting the scalar operand values from the pipeline register based on the instruction and circuitry for performing the arithmetic operation on the scalar operand values based on the instruction to generate a result value.

In one embodiments of the invention, the arithmetic logic unit is software programmable. The software programmable arithmetic logic unit of the present invention efficiently processes simple instructions as well as very complex instructions because every instruction produces a useful result. As such, the arithmetic logic unit of the present invention consumes less power than a conventional arithmetic logic unit in a graphics processor.

These and other objects and advantages of the various embodiments of the present invention will be recognized by those of ordinary skill in the art after reading the following detailed description of the embodiments that are illustrated in the various drawing figures.

BRIEF DESCRIPTION OF THE FIGURES

The accompanying drawings, which are incorporated in and form a part of this specification, illustrate embodiments of the present invention and, together with the description, serve to explain the principles of the invention:

FIG. 6 is a flowchart 600 of an exemplary process for processing graphics data according to one embodiment of the present invention.

FIG. 7 illustrates the interleaving of rows of pixel packets in accordance with one embodiment of the present invention.

Figure 1:
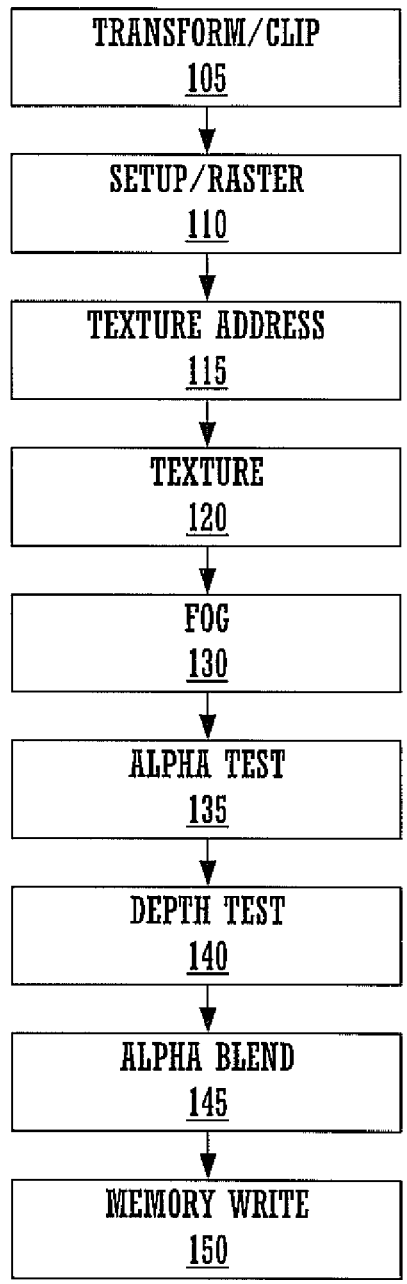
FIG. 1 is a diagram of a prior art pipeline for three-dimensional graphics.

The drawings referred to in the description should not be understood as being drawn to scale except if specifically noted.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "performing," "storing," "using," "producing," "receiving," "generating," "determining," "constructing," "accessing," "processing," "indexing," "clamping," "sending," "selecting" or the like, refer to actions and processes (e.g., flowcharts 600 and 900 of FIGS. 6 and 9, respectively) of a computer system or similar electronic computing device or processor. The computer system or similar electronic computing device manipulates and transforms data represented as physical (electronic) quantities within the computer system memories, registers or other such information storage, transmission or display devices. The present invention is well suited to use with other computer systems.

Figure 2A:
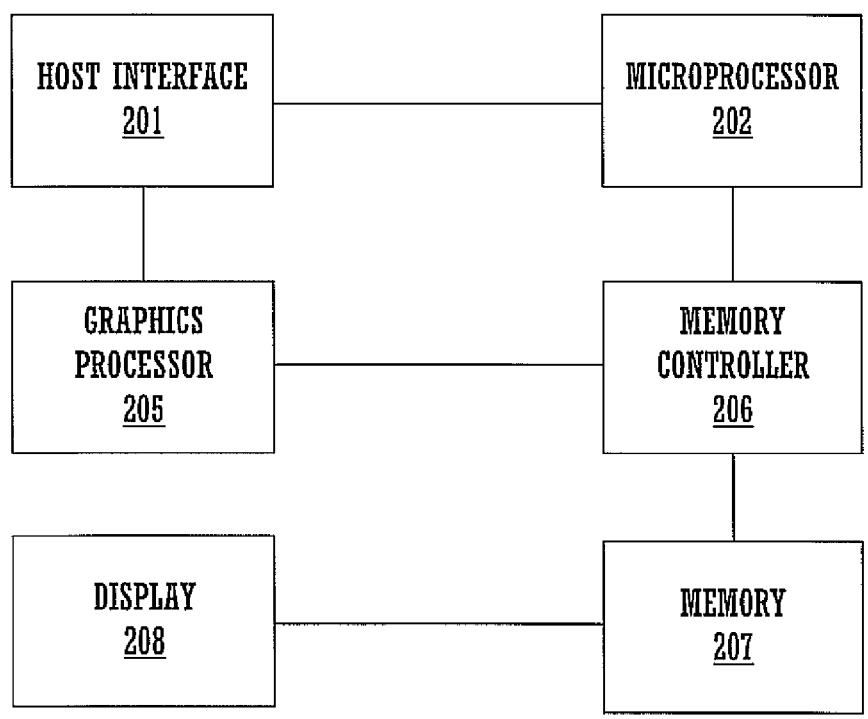
FIG. 2A is a block diagram of one example of a system upon which embodiments in accordance with the present invention may be implemented.

FIG. 2A is a block diagram of a system 200 upon which embodiments in accordance with the present invention may be implemented. System 200 shows the components of an execution platform for implementing certain software-based functionality of embodiments in accordance with the present invention. As depicted in FIG. 2A, the system 200 includes a microprocessor 202 coupled to a graphics processor 205 via a host interface 201. The host interface 201 translates data and commands passing between the microprocessor 202 and the graphics processor 205 into their respective formats. Both the microprocessor 202 and the graphics processor 205 are coupled to a memory 207 via a memory controller 206. In the system 200 embodiment, the memory 207 is a shared memory, whereby the memory 207 stores instructions and data for both the microprocessor 202 and the graphics processor 205. Access to the shared memory 207 is through the memory controller 206. The shared memory 206 also includes a video frame buffer for storing pixel data that drives a coupled display 208.

As described above, certain processes and steps of the present invention are realized, in one embodiment, as a series of instructions (e.g., a software program) that reside within computer-readable memory (e.g., memory 207) of a computer system (e.g., system 200) and are executed by the microprocessor 202 and graphics processor 205 of system 200. When executed, the instructions cause the system 200 to implement the functionality of embodiments of the present invention as described below.

As shown in FIG. 2A, system 200 includes the basic components of a computer system platform that implements functionality in accordance with embodiments of the present invention. Accordingly, system 200 can be implemented as, for example, a number of different types of portable handheld electronic devices. Such devices can include, for example, portable phones, personal digital assistants (PDAs), handheld gaming devices, or virtually any other type of device with display capability where there is an interest in rendering three-dimensional graphical images at low cost and low power. In such embodiments, components would be included that are designed to add peripheral buses, specialized communications components, support for specialized input/output (I/O) devices, and the like.

Additionally, it should be appreciated that although the components of FIG. 2A are depicted as discrete components, several of the components can be implemented as a single integrated circuit device (e.g., a single integrated circuit die) configured to take advantage of the high levels of integration provided by modern semiconductor fabrication processes. For example, in one embodiment, the microprocessor 202, host interface 201, graphics processor 205, and memory controller 206 are fabricated as a single integrated circuit die.

Figure 2B:
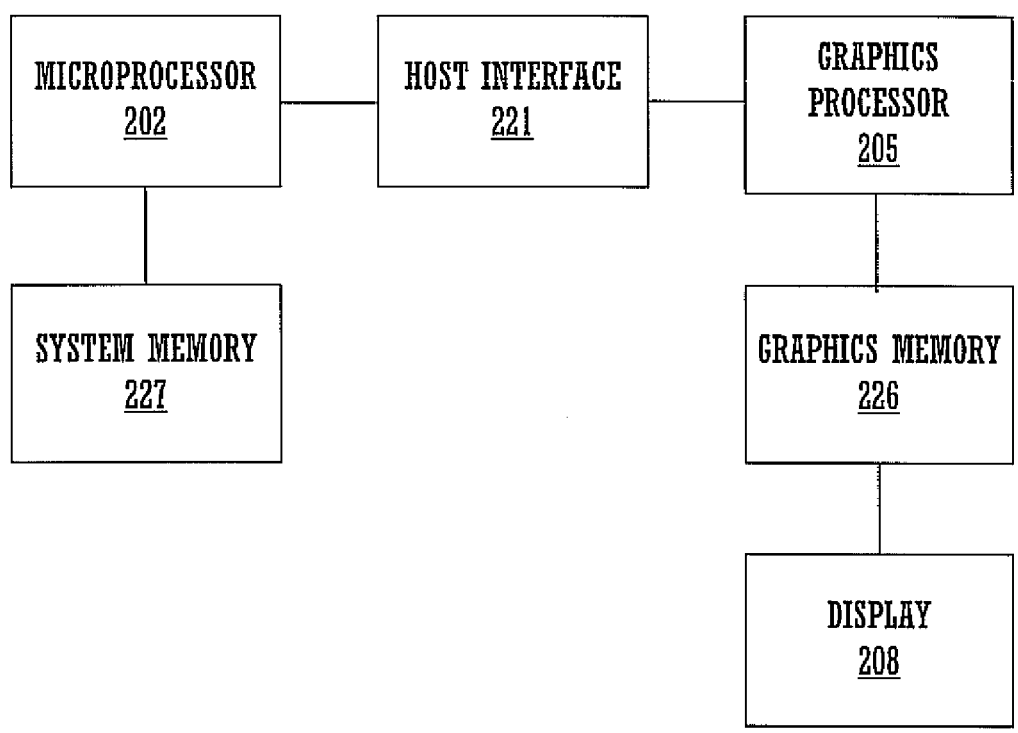
FIG. 2B is a block diagram of another example of a system upon which embodiments in accordance with the present invention may be implemented.

FIG. 2B shows a system 220 in accordance with an alternative embodiment of the present invention. System 220 is substantially similar to system 200 of FIG. 2A. System 220, however, utilizes a microprocessor 202 having a dedicated system memory 227, and a graphics processor 205 having a dedicated graphics memory 226. In the system 220 embodiment, the system memory 227 stores instructions and data for processes/threads executing on the microprocessor 202, and graphics memory 226 stores instructions and data for those processes/threads executing on the graphics processor 205. The graphics memory 226 stores pixel data in a frame buffer that drives the display 208. As with computer system 220 of FIG. 2A, one or more of the components of system 220 can be integrated as a single integrated circuit die.

Figure 3:
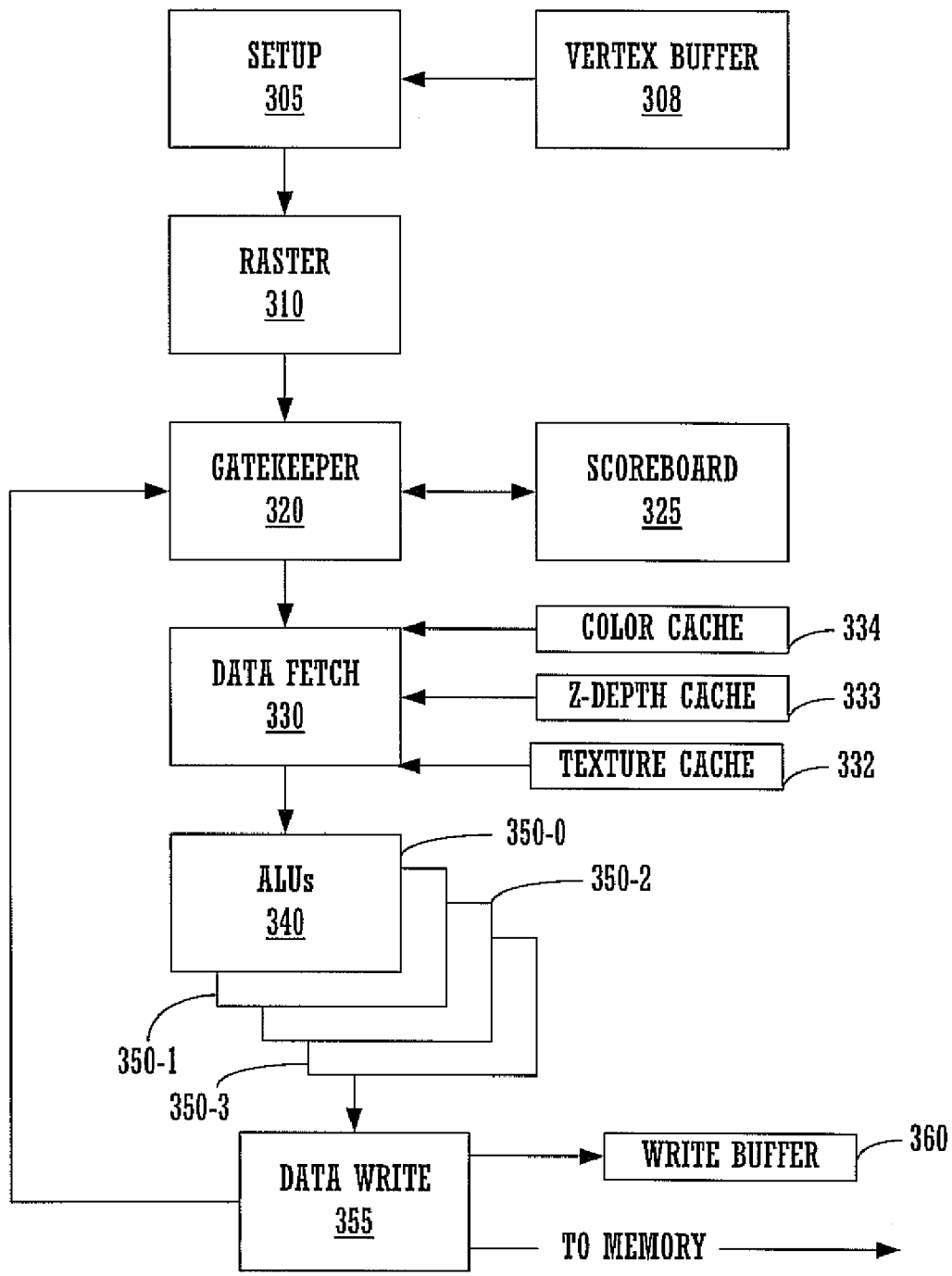
FIG. 3 is a block diagram of a pipeline architecture used by a programmable graphics processor in accordance with one embodiment of the present invention.

FIG. 3 is a block diagram of a pipeline 300 used by a graphics processor 205 (FIGS. 2A and 2B) in accordance with one embodiment of the present invention. In the present embodiment, pipeline 300 includes a setup stage 305, a raster stage 310, a gatekeeper stage 320, a data fetch stage 330, an Arithmetic Logic Unit (ALU) stage 340, and a data write stage 355. The function of each of these stages is described in general; however, it is appreciated that embodiments in accordance with the present invention are not limited to the functions described herein.

Setup stage 305 of FIG. 3 receives instructions and graphics primitives from a host, such as a software application running on system 200 or 250 of FIGS. 2A and 2B, respectively. In general, setup stage 305 calculates vertex parameters needed by raster stage 310. In one embodiment, setup stage 305 performs functions associated with the geometrical three-dimensional to two-dimensional transformation of coordinates, clipping, and setup. The setup stage 305 takes vertex information (e.g., x, y, z, color, texture attributes, etc.) and applies a user-defined view transform to calculate screen space coordinates for each geometrical primitive (hereinafter described as triangles because primitives are typically implemented as triangles), which are then sent to the raster stage 310 to draw a given triangle. A vertex buffer 308 may be included to provide a buffer for vertex data used by setup stage 305.

In general, raster stage 310 translates triangles to pixels using interpolation. Raster stage 310 receives data from setup stage 305 regarding triangles that are to be rendered (e.g., converted into pixels). Raster stage 310 determines which pixels correspond to which triangle including computation of parameters associated with each pixel, processes each pixel of a given triangle, and determines shader processing operations that need to be performed on a pixel as part of the rendering, such as color, texture, and fog operations.

Raster stage 310 generates a "pixel packet" for each pixel of a triangle that is to be processed. A pixel packet is, in general, a set of descriptions used for calculating an instance of a pixel value for a pixel in a frame of a graphical display. A pixel packet is associated with each pixel in each frame. Each pixel is associated with a particular (x,y) location in screen coordinates.

Each pixel packet includes a payload of pixel attributes required for processing (e.g., color, texture, depth, fog, [x,y] location, etc.) and sideband information (pixel attribute data is provided by the data fetch stage 330). In one embodiment, the sideband information includes a kill bit. If the kill bit is set somewhere in the pipeline 300, then the pixel packet will proceed through the remainder of the pipeline 300 without active processing. The kill bit is used to designate a pixel packet that is associated with a pixel that will not be rendered in a graphical display (e.g., it will not be rendered on the display screen).

The sideband information may include information in addition to a sequence number and kill bit; refer to the discussion of FIG. 4A below for other examples of sideband information. A pixel packet may contain one row of data or it may contain multiple rows of data. A row is generally the width of the pipeline bus.

In one embodiment, raster stage 310 of FIG. 3 calculates barycentric coordinates for each pixel packet. The use of barycentric coordinates improves dynamic range, which permits using fixed-point calculations that require less power than floating point calculations.

As each pixel of a triangle is walked through raster stage 310, raster stage 310 generates pixel packets for further processing which are received by gatekeeper stage 320. Gatekeeper stage 320 performs a data flow control function. In one embodiment, gatekeeper stage 320 has an associated scoreboard 325 for scheduling, load balancing, resource allocation, and hazard avoidance of pixel packets as well as recirculation. Scoreboard 325 tracks the entry and retirement of pixels. Pixel packets entering gatekeeper stage 320 set the scoreboard 325, and the scoreboard 325 is reset as the pixel packets drain out of pipeline 300.

Gatekeeper 320 and scoreboard 325 provide several benefits. Scoreboard 325 can track pixel packets that are capable of being processed by ALUs 350, along with those pixel packets that have their kill bit set. For example, if there are no valid pixel packets, the ALUs may be turned off (e.g., not clocked) to save power.

A data fetch stage 330 fetches data for pixel packets passed on by gatekeeper 320. Such data may include color information, any depth information, and any texture information for each pixel packet. In one embodiment, data fetch stage 330 also manages a local texture/fog cache 332, a depth cache 333, and a color cache 334. Fetched data is placed into an appropriate field in the pixel packet prior to sending the pixel packet on to the next stage. In one embodiment, the kill bit is set in data fetch stage 330 as a result of a z-fetch.

From the data fetch stage 330, pixel packets enter an ALU stage 340. In one embodiment, the ALU stage 340 includes multiple ALUs 350 configured to execute shader programming related to three-dimensional graphics operations such as, but not limited to, texture combine (texture environment), stencil, fog, alpha blend, alpha test, and depth test.

In the example of FIG. 3, there are four (4) ALUs 350-0, 350-1, 350-2, and 350-3. In one embodiment, the ALUs are series-coupled scalar units. While 4 ALUs 350 are illustrated, in other implementations, ALU stage 340 may incorporate a different number of ALUs 350.

In the present embodiment, each ALU 350-0, 350-1, 350-2, and 350-3 executes an instruction, each instruction for performing an arithmetic operation on operands that correspond to the contents of the pixel packets; refer to the discussion of FIGS. 4A through 4D below. In some embodiments, an ALU uses temporarily stored values from previous operations; refer to FIG. 8 below.

Continuing with reference to FIG. 3, an example of an arithmetic operation performed by ALUs 350-0, 350-1, 350-2, and 350-3 is a scalar arithmetic operation of the form (a*b)+(c*d), where a, b, c, and d are operand values that are obtained from a pixel packet. Each ALU 350-0, 350-1, 350-2, and 350-3 can perform other mathematical operations. Examples of other mathematical operations are provided in conjunction with the discussion of FIG. 4C below (specifically, see Table 1 for examples).

In some embodiments, each ALU 350-0, 350-1, 350-2, and 350-3 of FIG. 3 determines whether to generate a kill bit based on a test, such as a comparison of a*b and c*d (e.g., kill if a*b not equal to c*d). An individual ALU 350-0, 350-1, 350-2, and 350-3 can be disabled (e.g., not clocked) with regard to processing a pixel packet if the kill bit is set in a pixel packet. In one embodiment, a clock-gating mechanism is used to disable ALU 350-0, 350-1, 350-2 or 350-3 when a kill bit is detected in any row of a pixel packet. As a result, after a kill bit is generated for a row of a pixel packet, the ALUs 350-0, 350-1, 350-2, and 350-3 do not waste power on the row of the pixel packet as it propagates through ALU stage 340. However, note that a pixel packet with a kill bit set still propagates onwards, permitting it to be accounted for by data write stage 355 and scoreboard 325. This permits all pixel packets to be accounted for by scoreboard 325, even those pixel packets marked by a kill bit.

The output of the ALU stage 340 goes to the data write stage 355. The data write stage 355 stores pipeline results in a write buffer 360 or in a frame buffer in memory (e.g., memory 207 of FIG. 2A or memory 226 of FIG. 2B). Data write stage 355 indicates retired writes to gatekeeper stage 320 for scoreboarding. Optionally, pixel packets/data can be recirculated from the data write stage back to the gatekeeper 320 if further processing of the data is needed.

Figure 4A:
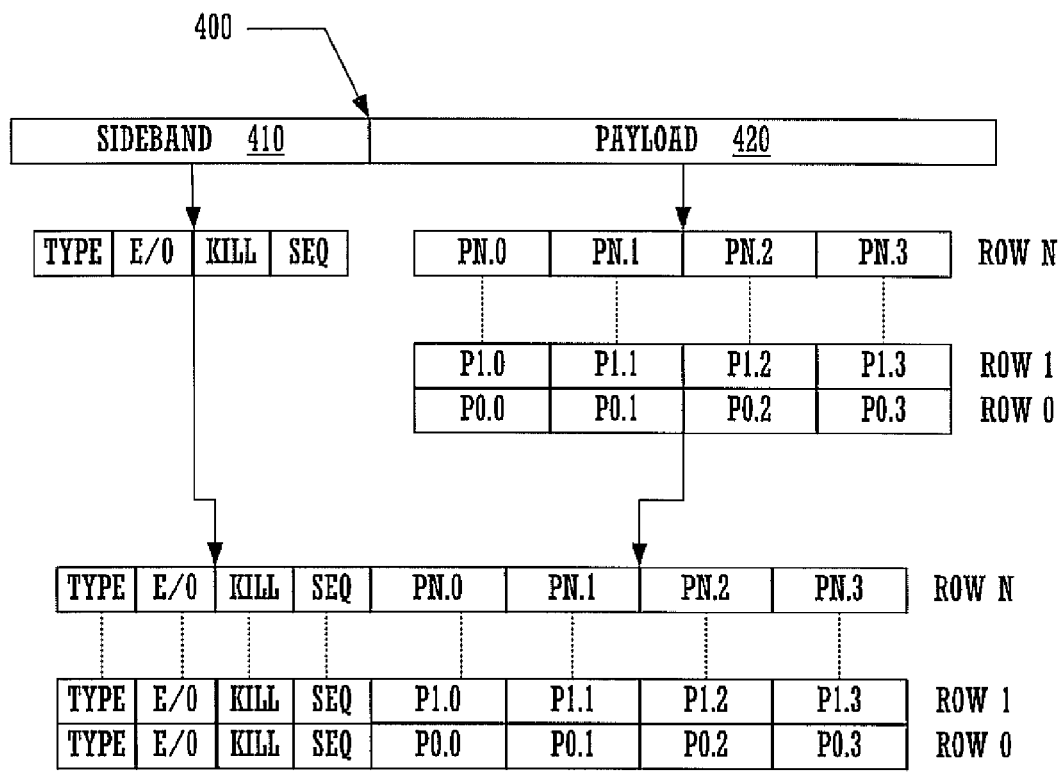
FIG. 4A is a data flow diagram showing the processing of a pixel packet in a pipeline in accordance with one embodiment of the present invention.

FIG. 4A is a data flow diagram showing processing of a pixel packet 400 in accordance with one embodiment of the present invention. As mentioned above, a pixel packet is, in general, a set of descriptions for a pixel in a graphical display. In the present embodiment, each pixel packet 400 includes sideband information 410 and payload information 420. In one such embodiment, payload information 420 includes, for example, color information, depth information, and texture information for the pixel that is associated with pixel packet 400.

In the present embodiment, sideband information 420 includes a "type" field of one or more bits. There may be different types of data packets flowing through the pipeline 300 of FIG. 3. The type field is used to identify packet 400 as a pixel packet containing pixel data. Alternately, the type field can identify packet 400 as a programming packet, used to update programmable state (such as instruction tables or constant register values) within the graphics pipeline.

In the present embodiment, sideband information 420 of FIG. 4A also includes an indicator flag referred to herein as an "even/odd" (e/o) field. In one embodiment, the e/o field is a single bit in length. The purpose of the e/o bit is described further in conjunction with FIGS. 7 and 8 below.

In the present embodiment, sideband information of FIG. 4A also includes a "kill" field. In one embodiment, the kill field is a single bit in length. As mentioned above, if the kill bit is set somewhere in the pipeline 300 of FIG. 3, then the pixel packet will proceed through the remainder of the pipeline 300 without active processing by each pipeline stage.

In the present embodiment, the sideband information 410 of FIG. 4A includes a "sequence" field. In one embodiment, the sequence field is three (3) bits in length. The sequence bits link the pixel packet 400 to an instruction that is to be applied to the pixel packet in the ALU stage 340; refer to FIG. 4B below.

Continuing with reference to FIG. 4A, in the present embodiment, the payload portion 420 of pixel packet 400 is separated into one or more "rows" 0, 1, ..., N in raster stage 310 of FIG. 3. That is, the payload portion 420 may consist of a single row, or it may consist of a group of rows.

In one embodiment, the payload portion of each row holds up to 80 bits of pixel data. In one such embodiment, the pixel data in each row is represented using 4 sets of 20-bit values. For example, row 0 include 4 sets of pixel data P0.0, P0.1, P0.2 and P0.3, each 20 bits in length. Each of the sets of 20-bit values may represent one or more instances or attributes of pixel data. Examples of pixel attributes that may be included in a 20-bit set of pixel data include, but are not limited to: 16-bit Z depth values; 16-bit (s,t) texture coordinates and a 4-bit level of detail value; a pair of color values in S1.8 format; or packed 5555 RGBA (red, green, blue, alpha) values, each five (5) bits in length.

The sideband information 410 for pixel packet 400 is associated with each row or rows formed from the payload portion 420. In one embodiment, each row includes the sideband information 410 and 80 bits of pixel data, as illustrated in FIG. 4A.

Each row of pixel packet 400 is processed in succession in pipeline 300 of FIG. 3 with each new clock cycle. For example, row 0 starts down pipeline 300 on a first clock, followed by row 1 on the next clock, and so on. Once all of the rows associated with pixel packet 400 are loaded into pipeline 300, rows associated with the next pixel packet are loaded into pipeline 300. As will be seen, in one embodiment, rows of pixel data for one pixel packet are interleaved with rows of pixel data from the next pixel packet and designated as "even" and "odd," respectively. By interleaving rows of pixel packets in this fashion, stalls in the pipeline 300 can be avoided, and data through is increased. This is discussed further in conjunction with FIG. 7 below.

Figure 4B:
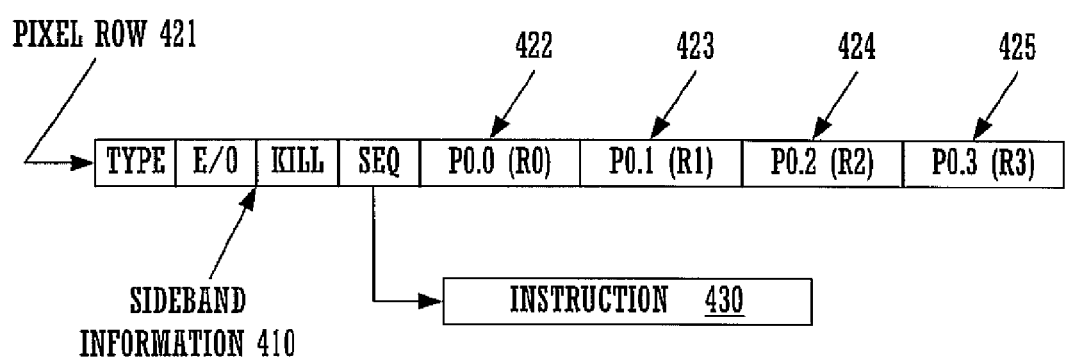
FIG. 4B is a data flow diagram illustrating the relationship between pixel data in a pipeline and an instruction executed by an arithmetic logic unit (ALU) in accordance with one embodiment of the present invention.

FIG. 4B is a data flow diagram illustrating the relationship between a row 421 of pixel data in a pipeline (e.g., pipeline 300 of FIG. 3) and an instruction 430 executed by an ALU (e.g., in ALU stage 340 of FIG. 3) in accordance with one embodiment of the present invention. FIG. 4B illustrates a single row 421 that includes 4 sets of pixel data 422, 423, 424 and 425 and sideband information 410. In one embodiment, each set of pixel data 422-25 is 20 bits in length. In the present embodiment, the sequence number SEQ in the sideband information 410 points to an instruction 430 to be executed by an ALU.

Figure 4C:
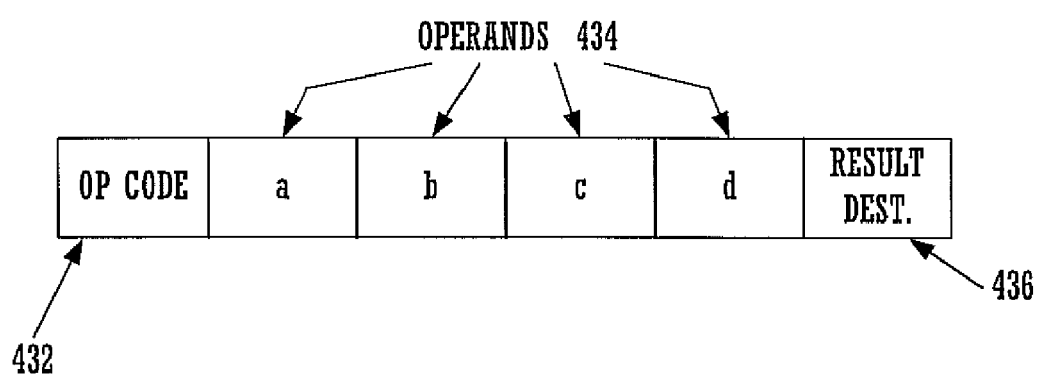
FIG. 4C illustrates one embodiment of an instruction executed by an ALU in accordance with the present invention.

FIG. 4C illustrates one embodiment of an instruction 430 executed by an ALU (e.g., in ALU stage 340 of FIG. 3) in accordance with the present invention. In the present embodiment, instruction 430 includes an operation (op) code 432; 4 designations 434 of sources for the operands identified as "a," "b," "c" and "d;" and a designation of where to place the result (result destination 436).

In one embodiment, the op code 432 is a 4-bit value that identifies the particular operation to be performed on the row of pixel data in an ALU. That is, instruction 430 is associated with a particular row of pixel data (e.g., pixel row 421) by the sequence number in the sideband information 410 for that row, and the op code 432 in instruction 430 identifies the type of operation to be performed on that row. Table 1 is a listing of example operations that can be executed by an ALU in accordance with embodiments of the present invention.

TABLE 1

Example Operations Performed by an ALU on Pixel Data
According to One Embodiment

| Name | Operation |
|---|---|
| MAD | r = a*b + c*d |
| MBA | r = a*b & c*d |
| MBO | r = a*b \| c*d |
| MBX | r = a*b ^ c*d |
| MUL | r(lo) = a*b  r(hi) = c*d |
| MIN | r = min (a*b, c*d) |
| MAX | r = max (a*b, c*d) |
| SNE | r = a*b != c*d ? 1:0 |
| SEQ | r = a*b == c*d ? 1:0 |
| SLT | r = a*b < c*d ? 1:0 |
| SLE | r = a*b <= c*d ? 1:0 |
| KNE | kill if a*b != c*d |
| KEQ | kill if a*b == c*d |
| KLT | kill if a*b < c*d |
| KLE | kill if a*b <= c*d |

The values of "a," "b," "c" and "d" in the instructions in Table 1 correspond to the input operands specified by the instruction 430. This is described further in conjunction with FIG. 4D, below.

In the present embodiment, the result destination 436 identifies where the result (e.g., the value "r" in Table 1) of an operation performed by an ALU is to be written. The result of an ALU operation can be written to a pipeline register for the next stage of the pipeline 300 (FIG. 3), and/or the result can be written to a temporary register that is integral to the ALU (e.g., for use with a subsequent row). This is described further in conjunction with FIGS. 5A and 8, below.

Figure 4D:
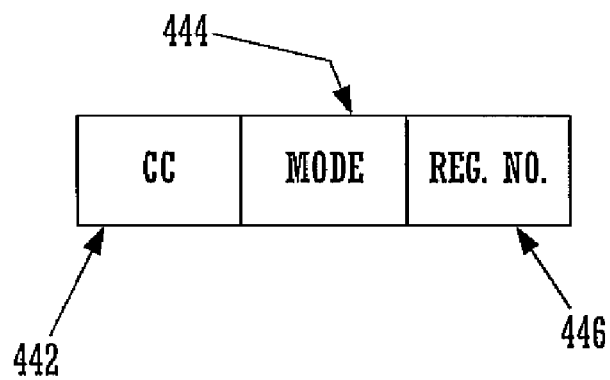
FIG. 4D provides further information regarding an operand field that is included in an instruction executed by an ALU in accordance with one embodiment of the present invention.

FIG. 4D provides further information regarding an operand field 434 that is included in an instruction 430 (FIG. 4C) executed by an ALU in accordance with one embodiment of the present invention. In the present embodiment, each operand 434 includes a "cc" field 442, a mode field 444, and a register number field 446. In one embodiment, the cc field 442 is a one-bit value that identifies, for example, whether the value of the operand is to be clamped or formatted, e.g., negated or used in its complement form (e.g., a value "x" has a complement of 1-x).

In one embodiment, the register number field 446 is a 3-bit value that identifies the source of the value for the operand 434. There is an operand 434 for each of the operands "a," "b," "c" and "d." Referring back to FIG. 4B, a row of pixel data can include 4 20-bit values (e.g., sets of pixel data 422-425). In one embodiment, each of these sets of pixel data resides in a pipeline register in the pipeline 300 of FIG. 3. The pipeline registers are referred to as R0, R1, R2 and R3. The register number 446 identifies which of the pipeline registers contains which operand value. For example, the register number 446 in the operand 434 that is associated with "a" can identify R1 as the source for the value of "a." Each of the other operand values (e.g., b, c and d) is determined in a similar fashion. In addition to the 4 attribute registers R0, R1, R2 and R3, additional encodings of the register number fields indicate whether other registers (e.g., the temporary registers 523 and the constant registers 522 of FIG. 5B) are to be addressed.

In one embodiment, the mode field 444 of FIG. 4D is a 3-bit value that identifies where in a set of pixel data the value of each operand can be found. As mentioned above, each of the sets of pixel data 422-425 (FIG. 4B) may represent one or more instances of pixel data, such as 4 5-bit RGBA values. The mode 444 identifies which segment of data in a set of pixel data 422, 423, 424 or 425 is to be used as the value of the operand 434. That is, in the present embodiment, the particular set of pixel data 422, 423, 424 or 425 is identified by the register number 446, and a particular data segment within the identified set of pixel data is identified by the mode 444. For example, the register number 446 in the operand 434 for "a" can identify R1 as the source for the value of "a," and the mode 444 in the same operand 434 identifies which segment of bits (e.g., the high 10 bits) is the value of "a." Each of the other operand values (e.g., b, c and d) is determined in a similar fashion. Table 2 below lists the various data segments in a set of pixel data and a respective mode 444 according to one embodiment of the present invention.

TABLE 2

Example Modes for Identifying Particular Data
in a Set of Data According to One Embodiment

| Mode | Data |
|---|---|
| 000 | All bits (16 or 20 bits) |
| 001 | High 10 bits |
| 010 | Low 10 bits |
| 011 | First 5 bits |
| 100 | Second 5 bits |
| 101 | Third 5 bits |
| 110 | Fourth 5 bits |
| 111 | Constant |

As indicated by Table 2, one of the modes identifies that the operand value is a constant. In one embodiment, if the operand is identified as a constant, the 3-bit value in the register number field 446 identifies a value for the constant. Constant values associated with the range of 3-bit values can be established in advance. For example, a 3-bit value of 000 can be used to indicate a constant value of zero; a 3-bit value of 001 can be used to indicate a constant value of 0.25; a 3-bit value of 010 can be used to indicate a constant value of 0.50; and so on.

Figure 5A:
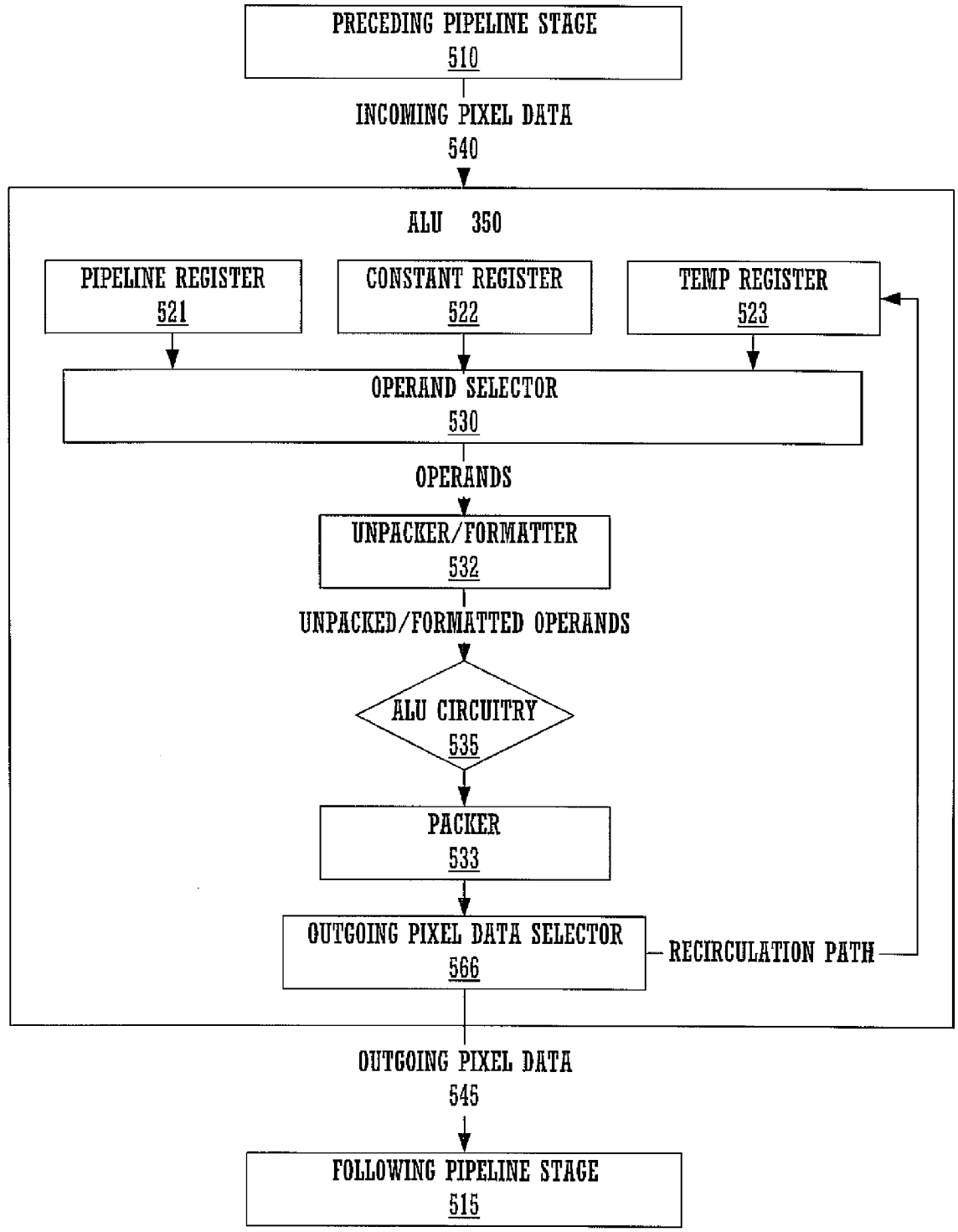
FIG. 5A is a block diagram of an exemplary ALU in a graphics pipeline in accordance with embodiments of the present invention.

FIG. 5A is a block diagram of an exemplary ALU 350 in a graphics pipeline 300 in accordance with embodiments of the present invention. ALU 350 is used for processing incoming pixel data 540. As mentioned above, in one embodiment, the incoming pixel data 540 is a row of a pixel packet that, in general, includes one or more sets of pixel data that describe attributes of a pixel in a frame of a graphical display. In one embodiment of the invention, ALU 350 is one of a plurality of series-coupled ALUs in the ALU stage 340 (FIG. 3). Each of the series-coupled ALUs operates concurrently on a different row of pixel data. The rows of pixel data being operated on by the series-coupled ALUs may be associated with the same pixel packet (hence, the same pixel) or with different pixel packets (hence, different pixels).

Significantly, in one embodiment, ALU 350 is a scalar unit (in contrast to a unified vector unit). Accordingly, ALU 350 operates on scalar data elements that are travel together in the pipeline 300 as a row of pixel data. As noted above in the discussion of FIG. 4A, in one embodiment, each row of pixel data includes a payload of 80 bits of pixel data.

In the present embodiment, incoming pixel data 540 represents one row of pixel data for a pixel in a frame of a graphical display. The incoming pixel data 540 is received from a preceding pipeline stage 510 of the pipeline 300. Depending on the placement of ALU 350 in the ALU stage 340 of FIG. 3, the preceding pipeline stage 510 may be the data fetch stage 330 or another ALU. In the latter case, the incoming pixel data 540 is the outgoing pixel data of the other ALU. In one embodiment of the invention, 4 scalar ALUs are series-coupled to form the ALU stage 340.

As described by FIG. 4A above, the incoming pixel data 540 of FIG. 5A (e.g., a row of a pixel packet) includes sideband information and payload information. In one embodiment of the invention, the payload information of the incoming pixel data 540 is resident in the pipeline register 521 (actually, one or more pipeline registers). In addition to the pipeline register 521, ALU 350 includes a temporary register 523 (actually, one or more temporary registers) and a constant value register 522 (actually, one or more constant value registers). The temporary register 523 can be used to store a result from a previous operation performed by ALU 350. A result stored in the temporary register 523 can then be used in the execution of a subsequent operation performed by ALU 350 within a given grouping of pixel packet rows, e.g., for a subsequent row. The constant value register 522 can be used to store constant values that can be used in operations performed by ALU 350. Constant values are loaded by using programming packets 421 as described in conjunction with FIGS. 4A and 4B above.

After the incoming pixel data 540 of FIG. 5A is pipelined into the pipeline register 521, the operand selector 530 selects operand values from the group of registers consisting of the pipeline register 521, the constant register 522 and the temporary register 523. In one embodiment of the invention, the operand selector 530 selects 4 scalar operand values (e.g., a, b, c and d) from that group of registers. Operand selector 530 may be a crossbar or some number of multiplexers that enable the 4 operand values to be selected from any of the registers 521, 522 and/or 523.

The scalar operand values are sent to the unpacker/formatter unit 532. The packer/formatter unit 532 formats the operands in a desired data format. The details of unpacking and formatting will be described in conjunction with FIG. 5B.

Continuing with reference to FIG. 5A, the selected operands are then sent to the ALU circuitry 535 where an arithmetic operation can be performed on the operands to generate a result value. In one embodiment of the invention, the arithmetic operation performed in the ALU circuitry 535 is in the form of (a*b) "op" (c*d), where "op" refers to a software programmable operation and "*" refers to a multiplication operation. The result value of the operation is then sent to a packer 533 to be packed into the format used in the outgoing row of pixel data 545.

The repacked result value is then sent to an outgoing pixel data selector 566, which may include a demultiplexer. In one embodiment, the repacked result value is 10 bits wide. In essence, the result of the arithmetic operation optionally replaces some portion of the incoming pixel data 540 to form the outgoing pixel data 545. The outgoing pixel data selector 566 forms the outgoing pixel data 545 by selecting values from the incoming pixel data 540 (those values that are not being replaced) and the result value. In general, the incoming pixel data 540 can be combined with the result value generated from the ALU circuitry 533, with the result value optionally replacing or overwriting a selected value in the incoming pixel data 540.

The ALU 350 can update one scalar value of the incoming pixel data 540 to generate the outgoing pixel data 545. Accordingly, the resulting outgoing pixel data 545 can include one new value. In addition, the result value generated by the ALU circuitry 535 can be recirculated to the temporary register 523 where it can be used in subsequent operations (e.g., used as an operand in subsequent arithmetic operations on subsequent rows of a group of pixel packets).

However, there can be instances in which the incoming pixel data 540 is not modified to include the result value. In some instances, the incoming pixel data 540 passes through ALU 350 without being operated on, or the incoming pixel data 540 may simply be multiplied by one (1) in ALU 350. In other instances, ALU 350 may determine a result value, but the result value may not replace any of the values in the incoming pixel data 540. For example, the result value may simply be written to the temporary registers 523.

The outgoing pixel data 545 is then sent to the following pipeline stage 515. In one embodiment of the invention, depending on the placement of ALU 350 in the series-coupled ALUs in the ALU stage 340 (FIG. 3), the following pipeline stage 515 may be another ALU or it may be the data write stage 355.

To summarize, all or some of the incoming pixel data 540 may pass through an ALU without being modified. Per ALU, the result of an ALU operation may be used to update one pixel attribute in a row of pixel data. The modified pixel attribute is combined with the other (unmodified) data in the incoming pixel data 540 and pipelined to the next stage of pipeline 300 (e.g., to the next ALU, or to the data write stage). The result of an ALU operation can also be written to one of the temporary registers 523. With 4 ALUs, 4 pixel attributes may be updated in the ALU stage 340 of FIG. 3. If further processing of a pixel is desired, the pixel data can be recirculated to the gatekeeper stage 320 of the pipeline 300 (refer to FIG. 3).

In the present embodiment, a row of pixel data is pipelined into ALU 350 of FIG. 5A each clock cycle. In one implementation, it takes two (2) clock cycles for a row of pixel data to pass through ALU 350 (the ALU has a latency of 2 clock cycles). However, during each clock cycle, a row of pixel data is being operated on by ALU 350, thereby providing a throughput per clock cycle. Accordingly, a row of pixel data is pipelined out of ALU 350 each clock cycle. Thus, although each ALU has a latency of 2 clock cycles, each ALU has a throughput of 1 row of pixel data per clock cycle. Note that, for an embodiment in which there are 4 series-coupled ALUs, it takes eight (8) clock cycles for a row of pixel data to travel through the ALU stage 340 of FIG. 3.

In one embodiment of the invention, the ALU circuitry 535 of FIG. 5A can detect operations that result in mathematical identities (e.g., multiplying by zero or one). For example, the operation c*d, if "c" or "d" is zero, would result in a value of zero. When the ALU circuitry 535 discovers an operation that results in a mathematical identity, the ALU 350 shuts off (e.g., gates off) the portion of the circuitry associated with the operation, and forwards the result without actually performing the mathematical operation.

Figure 5B:
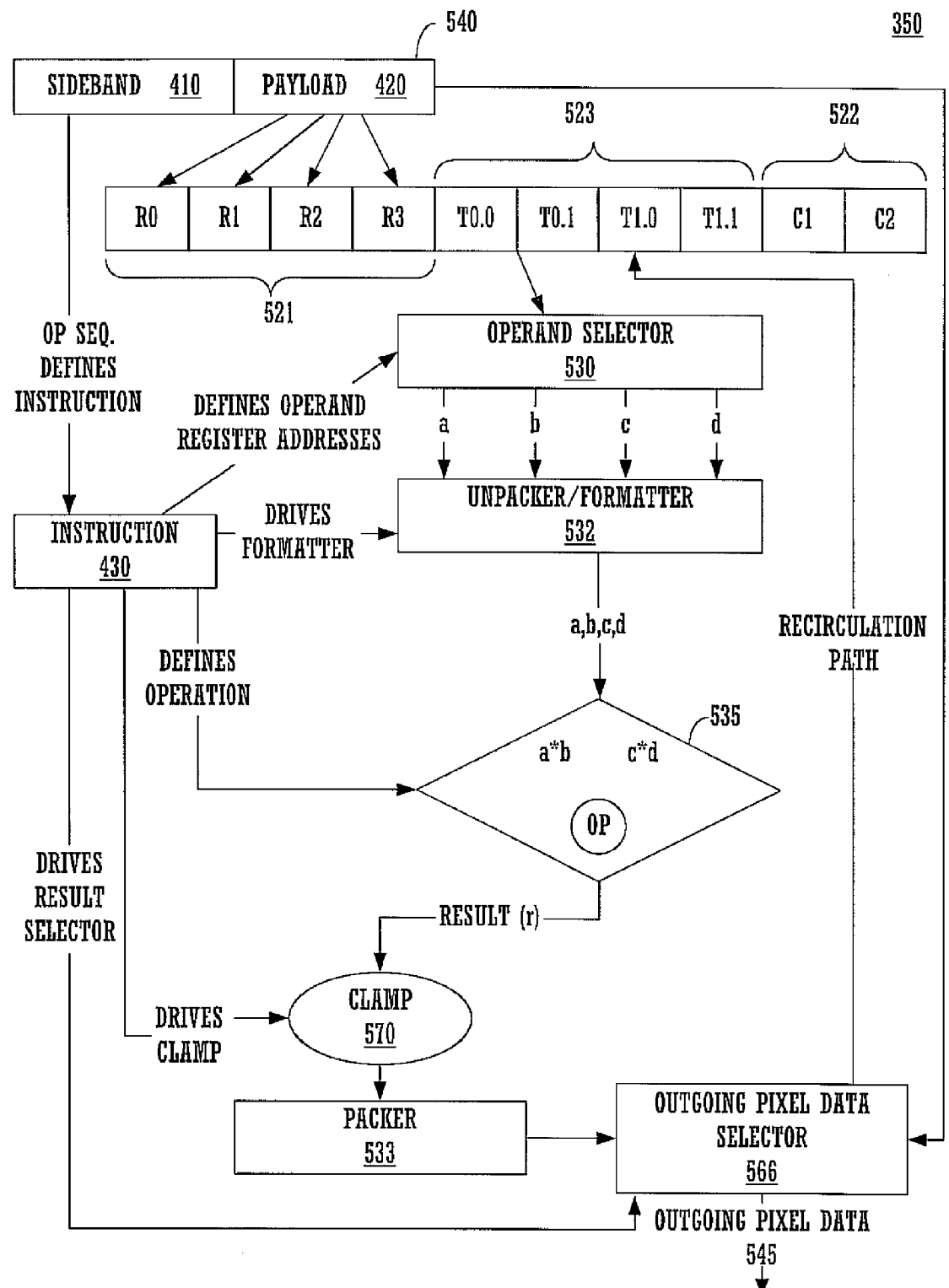
FIG. 5B is a data flow diagram of an exemplary ALU in accordance with embodiments of the present invention.

FIG. 5B is a data flow diagram of an exemplary ALU 350 in accordance with embodiments of the present invention. As stated above, the ALU stage 340 includes a plurality of scalar ALUs. In one embodiment of the invention, the ALUs are coupled sequentially. Depending on the placement in the series-coupled ALUs, the outgoing pixel information of a first ALU can be used as the incoming pixel information of a second ALU. With ALUs coupled in series, each ALU of the ALU stage 340 can perform a different operation or a different graphics function simultaneously.

For example, consider an example of a fog calculation performed using 4 ALUs. A fog calculation may be represented as: (fog_fraction)*color+(1−fog_fraction)*(fog_color). The value of fog_fraction can be represented using operand "a" read from one of the pipeline registers 521. The value of color can be represented using operand "b" read from another of the pipeline registers 521. The value of (1−fog- _fraction) can be represented using operand "c" read from yet another of the pipeline registers 521 (actually, the value of fog can be read from the pipeline register, and then the complement is determined and used). The value of fog_color can be represented using operand "d" read from one more of the pipeline registers 521 or from one or more of the constant registers 522. Three of the 4 ALUs can perform the fog calculation (one ALU for each of the colors red, green and blue) for one pixel. The fourth ALU can be used to perform an alpha test, for example, on the same pixel or perhaps some other type of operation on a different pixel. Thus, in one clock cycle on 4 different ALUs, different graphics functions are performed, perhaps on different pixels. Importantly, the pixel data is packed and provided to the ALUs and the instructions for operating on the pixel data are specified in such a way that each of the ALUs is doing something useful on each clock cycle.

As stated above, an ALU (e.g., ALU 350 of FIG. 5B) executes an instruction 430 that identifies an operation to be performed on pixel data in a pixel row. A row of pixel data (e.g., pixel row 421 of FIG. 4B) enters ALU 350 each clock cycle. In one embodiment of the invention, incoming pixel data 540 includes payload information 420 and sideband information 410. In one embodiment of the invention, the payload information 420 is stored in the pipeline register 521 (the pipeline registers R0, R1, R2 and R3 are collectively referred to as the pipeline register 521). As mentioned in conjunction with FIG. 4A, in one embodiment, the payload portion 420 of a row of pixel data is 80 bits wide, separated into 4 sets of pixel data 421-425, each 20 bits wide. In such an embodiment, each of the pipeline registers 521 (R0, R1, R2, R3) is 20 bits wide and holds one set of pixel data from a row of pixel data. In general, the width of each pipeline register R0, R1, R2 and R3 corresponds to the width of each set of pixel data in the payload portion 420 of a row of pixel data.

Included in the sideband information 410 of FIG. 5B is an operation sequence number (e.g., sequence identifier) that instructs the ALU 350 to perform a particular instruction 430. In one embodiment of the invention, the instruction 430 is retrieved from an instruction table in memory (e.g., memory 207 or graphics memory 226 of FIGS. 2A and 2B, respectively). The instruction 430 provides to the operand selector 530 the locations of the operands (e.g., using the register number 446 as described above in conjunction with FIG. 4D).

The operand selector 530 of FIG. 5B selects a plurality of operands from the various registers (e.g., pipeline register 521, temporary register 523 [T0.0, T0.1, T1.0, T1.1 are collectively referred to as the temporary registers 523] and constant registers 522 [C1 and C2 are collectively referred to as the constant registers 522]) according to the instruction 430. In one embodiment of the invention, any of the operands can come from any of the registers. In one embodiment of the invention, the operand selector 530 is a crossbar selector comprising a stage of multiplexers for selecting the source of the operands.

The operands (e.g., a, b, c, d) are then sent to the unpacker/formatter 532 to be unpacked and formatted into a desired data format. The operand values could be in various formats when selected by the operand selector 530 (refer to the discussion of FIG. 4A above). In one embodiment of the invention, the unpacker/formatter 532 formats the operands into a signed 1.8 (S1.8) format. The S1.8 format is a base 2 number with an 8-bit fraction that is in the range of (−2 to +2). The S1.8 format permits a higher dynamic range for calculations in which the result can optionally be clamped to a value between 0 and 1. For example, in calculations having a result in the range of 0 to 1, the S1.8 format permits the operands used in the ALU circuitry 535 to have an increased dynamic range, resulting in improved precision of calculations.

In addition to formatting the data into a desired format, the unpacker/formatter 532 of FIG. 5B can also select a negative value (−x), or a complement value (1−x) for each of the operands (where "x" is an operand). The instruction 430 instructs the unpacker/formatter 532 to select the operand value, a negative operand value or a complement of an operand value. In one embodiment of the invention, the unpacker/formatter 532 includes a stage of multiplexers for selecting the operand, a complement operand value or a negative operand value.

The operands are then processed by the ALU circuitry 535. In one embodiment of the invention, the operation performed in the ALU circuitry 535 is in the form of (a*b) "op" (c*d) where "op" is specified according to the instruction 430 (refer to the discussion of FIG. 4C above). As stated above, the ALU circuitry 535 can detect mathematical identities and can determine the value of the mathematical identity without actually performing the calculation.

The result "r" from the ALU circuitry 535 of FIG. 5A is then sent through a clamp 570 where the result can be clamped to a value within a specified range (in one embodiment, the range is 0 to 1). The instruction 430 specifies whether the result will be clamped or not. In one embodiment of the invention, the clamp 570 includes a multiplexer for selecting the result value or a clamped value.

The result value "r" is then sent through a packer 533 to be packed into the data format used for the operand that it will optionally be replaced by the result in the outgoing pixel data 545. The packed result value is sent to the outgoing pixel data selector 566. The outgoing pixel data selector 566 is driven by the instruction 430 to generate an outgoing row of pixel data 545. In one embodiment of the invention, depending on the operation being performed, ALU 350 returns up to a 10-bit result value. In this embodiment of the invention, the payload information 420 (80 bits) of the incoming pixel data 540 is combined with the result value (up to 10 bits) to generate an outgoing pixel packet of 80 bits, wherein up to a 10-bit value of the payload 420 is replaced with the similarly sized result value. Note that for the MUL opcode, a 20-bit result can be written (high and low 10-bit values at the same time).

In one embodiment of the invention, the outgoing pixel data selector 566 includes a demultiplexer for forming the outgoing row of pixel data 545 from the incoming pixel data 540 (e.g., from the payload 420) and the result value. The outgoing pixel data 545 (which may include the result value) is then sent to a following ALU stage or subsequent ALU.

In one embodiment of the invention, perhaps in response to a kill bit being set, ALU 350 does not perform any operations on the incoming pixel data. In this embodiment, the payload 420 of the incoming pixel data is sent through the ALU to the following pipeline stage or subsequent ALU. In one such embodiment, the ALU circuitry 535 is powered down to reduce power consumption. In effect, the kill bit acts as an enabling bit. If the kill bit is set, a data latch is not enabled, and power is saved because no power is consumed to transition the latch.

In one embodiment of the invention, the result value of an operation is recirculated into the temporary registers 523 so that it can be used in subsequent operations. This is described further in conjunction with FIG. 8 below.

Figure 5C:
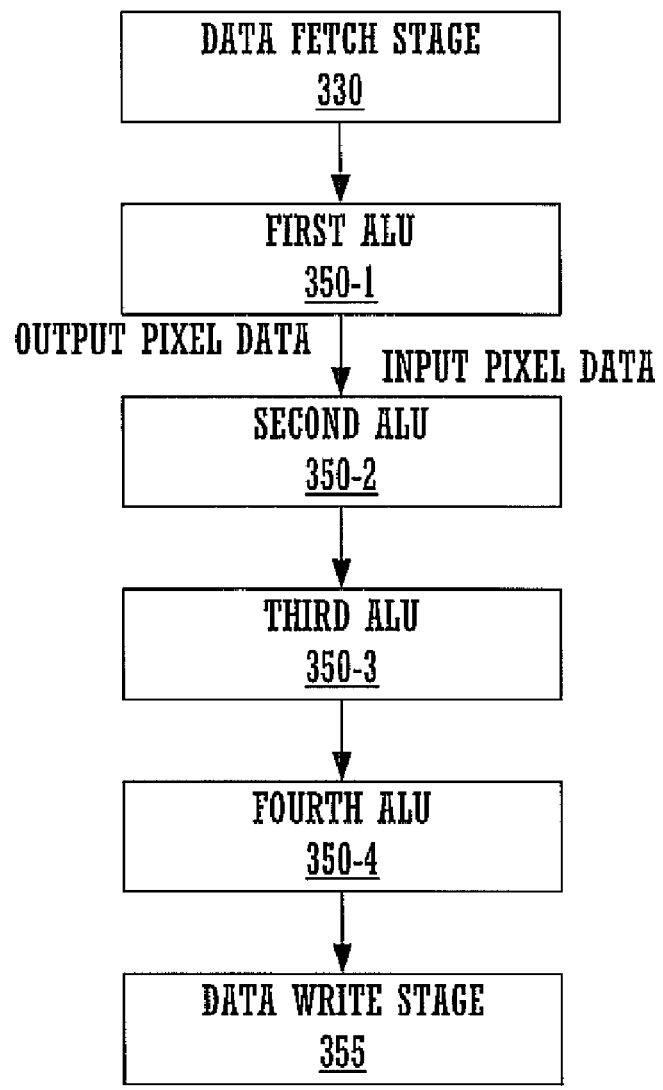
FIG. 5C is a block diagram showing four series-coupled ALUs in accordance with one embodiment of the present invention.

FIG. 5C is a block diagram showing four series-coupled ALUs 350-1, 350-2, 350-3 and 350-4 in accordance with one embodiment of the present invention. ALU 350-1 receives incoming pixel data (e.g., a row of pixel data) from the data fetch stage 330. Outgoing pixel data from ALU 350-1 is the incoming pixel data for ALU 350-2, and so on through ALU 350-3 and 350-4. The output pixel data from ALU 350-4 is input to the data write stage 355.

FIG. 6 is a flowchart 600 of an exemplary process for processing graphics data according to one embodiment of the present invention. Although specific steps are disclosed in flowchart 600, such steps are exemplary. That is, the present invention is well suited to performing various other steps or variations of the steps recited in flowchart 600. It is appreciated that the steps in flowchart 600 may be performed in an order different than presented and that the steps in flowchart 600 are not necessarily performed in the sequence illustrated.

In the present embodiment, the step 610 includes generating a first set of pixel data, the first set of pixel data comprising payload information comprising a plurality of scalar pixel attribute values and sideband information comprising a processing sequence identifier corresponding to a software programmable instruction for a first operation to be performed.

Step 615 includes sending the first set of pixel data to an ALU stage comprising a plurality of scalar ALUs for processing the first set of pixel data based on the instruction. In one embodiment of the invention, the ALU stage includes 4 scalar ALUs.

Step 620 includes selecting a set of operands to be processed at a first ALU. In one embodiment of the invention, 4 scalar values (e.g., a, b, c, d) are used as operands.

Optional step 625 includes selecting a negative value or a complement value of an operand value. In one embodiment of the invention, an instruction, indicated in the sideband information, instructs the ALU to perform step 625 or not.

Step 630 includes processing the operands and generating a result value therefrom.

Optional step 635 includes clamping the result value within a range of values. In one embodiment of the invention, the instruction determines if the result is clamped or not.

Optional step 640 includes sending the result value to a temporary register accessible by the first ALU. In one embodiment of the invention, the instruction determines if the result value is recirculated to a temporary register.

Step 645 includes sending pixel data to a pipeline register in a second ALU or some other stage of the graphics pipeline. In one embodiment of the invention, the first ALU combines the first set of pixel data with the result value to generate a second set of pixel data. The second set of pixel data can be sent to a subsequent ALU, or to a following graphics pipeline stage such as a data write stage. In one embodiment of the invention, there are 4 scalar ALUs. Each of the ALUs can update one scalar value of the first set of pixel data. As a result of propagating through the 4 ALUs, the first set of pixel data could have no new values, one new value, two new values, three new values or four new values. In the case an ALU does not return a result value, the ALU circuitry is powered down to reduce power consumption.

In summary, the use of a number of series-coupled ALUs in accordance with particular embodiments of the present invention provide a number of advantages. In general, the graphics functions of the pipeline all pass through the same group of ALUs. That is, each ALU can perform any of a variety of graphics functions that may be required by the graphics pipeline. Furthermore, each of the ALUs can operate simultaneously with the other ALUs to perform the same graphics function or a different graphics function on pixel data. Moreover, one or more pixels can be processed simultaneously by the ALUs. Also, the ALUs operate on scalar values rather than vector values. As such, the width of the graphics pipeline can be reduced and the pixel data formatted accordingly. That is, rather than working on a full width of pixel data associated with a pixel in a frame, the pixel data can be separated into rows of pixel data. By maintaining a narrow pipeline, graphics processing is made more efficient for typical usage cases, an advantage in devices such as PDAs where power conservation is important.

FIG. 7 illustrates an interleaving of rows of pixel packets in accordance with one embodiment of the present invention. As described in conjunction with FIG. 4A above, a pixel packet 400 (specifically, the payload portion 420 of a pixel packet) can be divided into multiple rows. According to the present embodiment, the rows associated with one pixel are interleaved with the rows of another pixel as they propagate through the pipeline. In the example of FIG. 7, row 0 of pixel 1 is interleaved between rows 0 and 1 of pixel 0. Similarly, row 1 of pixel 0 is interleaved between rows 0 and 1 of pixel 1, and so on. The interleaved rows are sent into and through pipeline 300 in the order of interleaving. Therefore, in general for any given frame, a portion of the data for one pixel (e.g., pixel 1) is sent into and through pipeline 300 (FIG. 3) before the entirety of the data for the preceding (e.g., pixel 0) is sent into and through pipeline 300.

In one embodiment, as described above in conjunction with FIG. 4B, an indicator flag or even/odd (e/o) bit is included in the sideband information 420 that is associated with each pixel row. For example, when the rows from two pixels are interleaved, the pixel rows associated with pixel 0 can be identified by setting the e/o bit to zero (0), while the pixel rows associated with pixel 1 can be identified by setting the e/o bit to one (1).

In the present embodiment, for any given frame, only the rows associated with two pixels (e.g., pixel 0 and pixel 1) are interleaved. However, in other embodiments, rows for more than two pixels can be interleaved. The number of bits in the e/o field of the sideband information 420 can be increased, depending on the number of pixels having rows that are interleaved. For example, if pixel rows for 4 pixels are interleaved, the e/o field can be increased to 2 bits. The extent of interleaving may be based on the latency of one ALU.

Interleaving pixel rows as described above avoids stalls in the pipeline 300 of FIG. 3, in particular in the ALU stage 340. In one implementation according to embodiments of the present invention, there is a 2 clock cycle latency associated with each of the ALUs 350. That is, it can take 2 clock cycles for a particular row of pixel data to travel through an ALU 350. However, on occasion, there can be a need to use a result that is generated using one row of pixel data with another row of pixel data in the same ALU.

For example, at clock cycle N, ALU 350 may perform an operation using the data associated with pixel 0 row 0, generating a result "r." The result "r" may be needed at clock cycle N+1 for an operation that will be performed using the data associated with pixel 0 row 1. However, because of the 2 clock cycle latency associated with ALU 350, the result "r" would not be available at the next clock cycle (cycle N+1). Instead, the result "r" is not available until clock cycle N+2. To avoid stalling pipeline 300 (that is, to avoid delaying the processing of pixel 0 row 1 until the result "r" is available), a row of pixel data for another pixel (e.g., row 0 of pixel 1) is pipelined into ALU 350 and operated on by ALU 350 in clock cycle N+1. At the next clock cycle (cycle N+2), the pixel data for pixel 0 row 1 is pipelined into the ALU 350 and the result "r" is available. Accordingly, at clock cycle N+2, ALU 350 can perform an operation using the result "r" and the pixel 0 row 1 pixel data.

Note that the pixel data for pixel 1 row 0 will overwrite any information in the ALU 350 pipeline registers. In one embodiment, the result "r" is persisted from clock cycle to the next by writing it to a temporary register that is local to the ALU 350 but different from the pipeline registers (see FIGS. 5A and 5B above). The use of temporary registers is described further in conjunction with FIG. 8 below.

The sequence of events described above is summarized in Table 3, which provides an example of some of the processing that can occur in an ALU along a timeline of clock cycles in accordance with one embodiment of the present invention. The example above, summarized by Table 3, describes a result being written to a temporary register. In actuality, the writing of a result to a temporary register is optional. That is, the result may not be written to a temporary register if it is not needed for a subsequent operation. Also, as discussed above, the result can optionally be written to the pipeline register for the next pipeline stage. In one embodiment, the destination 436 of the result of an ALU operation is specified according to instruction 430 of FIG. 4C.

TABLE 3

Example of Pixel Data Being Operated on by an ALU and Written to a Temporary Register According to One Embodiment

| Clock Cycle | ALU Activity |
|---|---|
| N | Receive data for pixel 0 row 0 at pipeline register(s) of the ALU (e/o = 0); First operation performed on pixel 0 row 0 data, generating a first result (r1). |
| N + 1 | Write r1 to first temporary register of ALU; Receive data for pixel 1 row 0 at pipeline register(s) of the ALU (e/o = 1); Second operation performed on pixel 1 row 0 data, generating a second result (r2). |
| N + 2 | Write r2 to second temporary register of ALU; Receive data for pixel 0 row 1 at pipeline register(s) of the ALU (e/o = 0); Third operation performed on pixel 0 row 1 data and also using r1, generating a third result (r3). |
| N + 3 | Write r3 to third temporary register of ALU; Receive data for pixel 1 row 1 at pipeline register(s) of the ALU (e/o = 1); Fourth operation performed on pixel 1 row 1 data and also using r2, generating a third result (r4). |
| Etc. | Etc. |

In the example of Table 3, mention is made of first, second and third temporary registers. In one embodiment, there are 4 temporary registers. In such an embodiment, two of the temporary registers are associated with one set of pixel data (e.g., "even" pixel 0) and are active for that pixel, and the other two temporary registers are associated with the other set of pixel data (e.g., "odd" pixel 1) and are active for that pixel. The e/o bit of FIG. 4B, along with the register number 446 (FIG. 4D) or the destination 436 specified in the instruction 430 of FIG. 4C, is used to control which of the temporary registers the result of an ALU operation is read from or written to. By performing this temporary register multiplexing automatically based on the e/o bit of FIG. 4B, software is shielded from knowledge of this latency-hiding mechanism.

Figure 8:
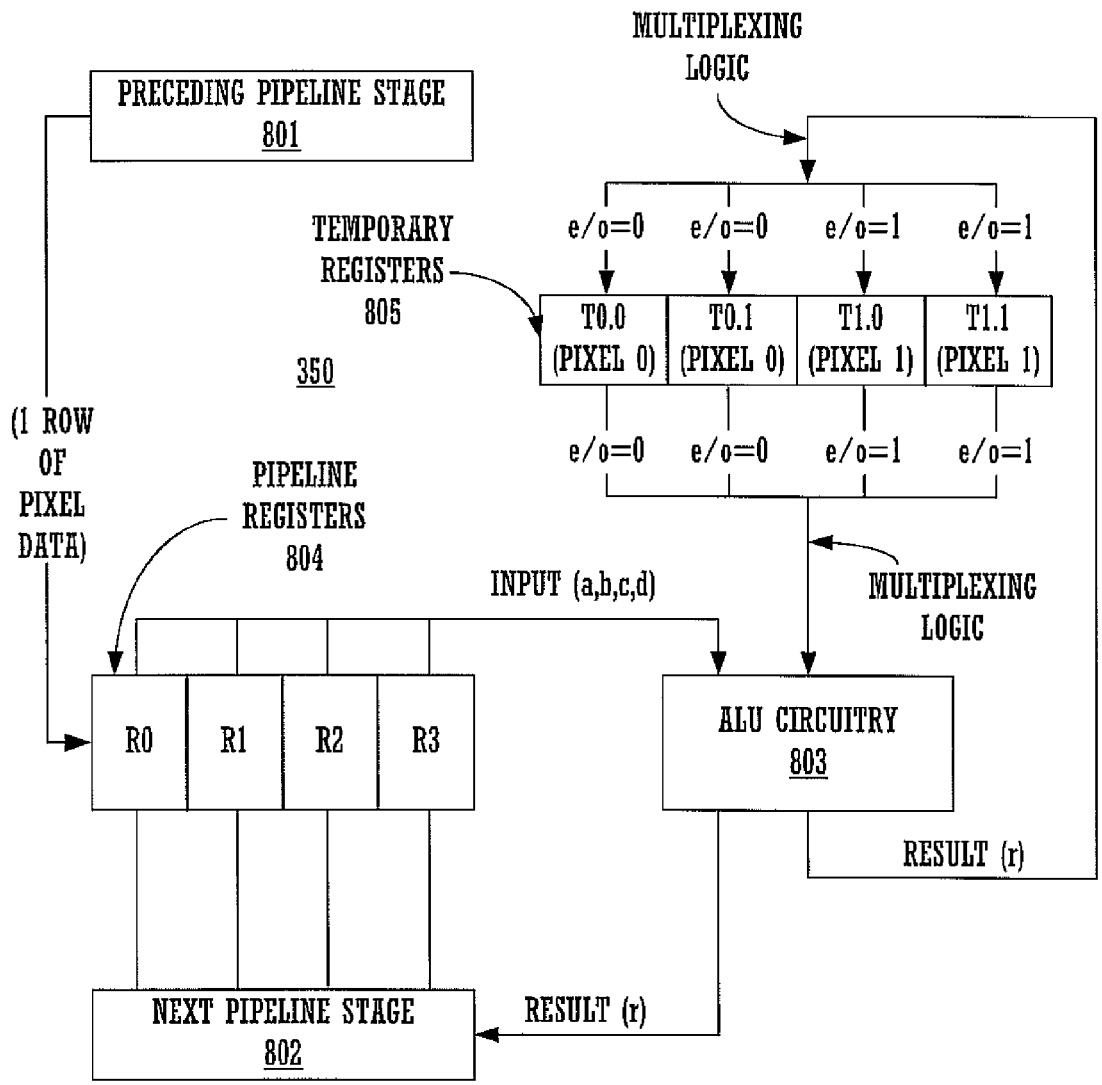
FIG. 8 is a data flow diagram showing the flow of data in an ALU with local temporary registers in accordance with one embodiment of the present invention.

FIG. 8 is a data flow diagram showing the flow of data in an ALU 350 with local temporary registers in accordance with one embodiment of the present invention. As described above, ALU 350 can include elements other than those shown in FIG. 8 (refer to FIGS. 5A and 5B above, for instance). The example of FIG. 8 illustrates a case in which 4 temporary registers T0.0, T0.1, T1.0 and T1.1 are used; however, the present invention is not so limited. In general, the number of temporary registers is a design decision. In one embodiment, 4 temporary registers are used because 4 temporary registers are considered adequate when the rows of two pixels are interleaved.

In one embodiment, the width of each of the temporary registers T0.0, T0.1, T1.0 and T1.1 is 20 bits. In general, the width of the temporary register corresponds to the width of the sets of pixel data 422-425 of FIG. 4B.

In the present embodiment, a row of pixel data is received at pipeline registers 804 from a preceding (e.g., upstream) stage 801 in the pipeline 300. The preceding pipeline stage 801 may be another ALU in the ALU stage 340, or it may be the data fetch stage 330 (FIG. 3). In the example of FIG. 8, there are 4 pipeline registers; however, the present invention is not so limited.

As previously described herein, ALU circuitry 803 operates on the data in the pipeline registers 804 to generate a result "r." The result "r" is optionally written to the next pipeline stage 802 of pipeline 300. Specifically, as described previously herein, the result "r" optionally replaces (overwrites) one of the pixel attribute values in the pipeline registers 804 (R0, R1, R2 and R3) before the contents of the pipeline registers are processed in the next pipeline stage 802.

According to the present embodiment of the present invention, the result "r" is also written to one of the temporary registers T0.0, T0.1, T1.0 or T1.1. In one embodiment, an indicator flag (e.g., the e/o bit of FIG. 4B), along with the destination 436 specified in the instruction 430 of FIG. 4C, is used to control which of the temporary registers the result of an ALU operation is written to. The indicator flag (e.g., e/o bit) controls multiplexing logic (e.g., a multiplexer) that routes the result "r" to the proper temporary register.

Continuing with reference to FIG. 8, for a subsequent operation using "r," an indicator flag (e.g., the e/o bit of FIG. 4B), along with the register number 446 of FIG. 4D, is used to control which of the temporary registers the result of an ALU operation is read from. The indicator flag (e.g., e/o bit) controls multiplexing logic (e.g., a multiplexer) that reads the result "r" from the proper temporary register.

As described in conjunction with FIG. 7 and Table 3 above, the rows of pixel data for a number of different pixels (e.g., 2 pixels, P0 and P1) are interleaved. As a result, in one embodiment, the value of the indicator flag essentially toggles back and forth between 0 and 1 each clock cycle. Accordingly, in such an embodiment, a different set of temporary registers are made active and used each clock cycle until the processing of pixels 0 and 1 in ALU 350 is completed. For example, at clock cycle N (and at every other clock cycle thereafter until processing of pixel 0 is completed in ALU 350), the temporary registers associated with pixel 0 are used (e.g., T0.0 and T0.1), and at clock cycle N+1 (and at every other clock cycle thereafter until processing of pixel 1 is completed in ALU 350), the temporary registers associated with pixel 1 are used (e.g., T1.0 and T1.1).

Figure 9:
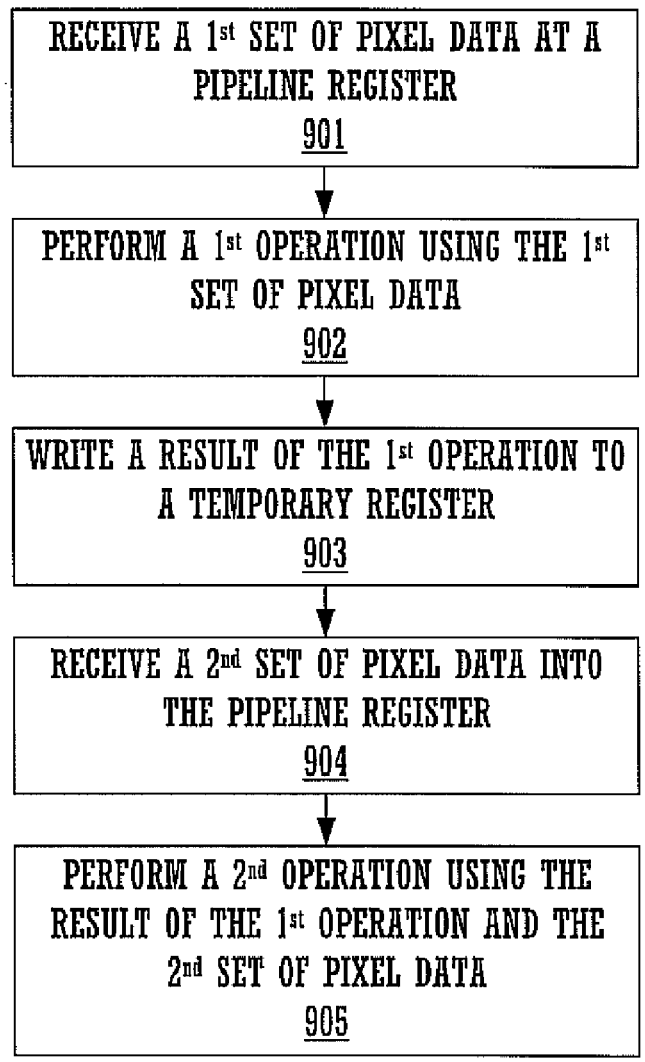
FIG. 9 is a flowchart of a method for processing data in an ALU with temporary registers in accordance with one embodiment of the present invention.

FIG. 9 is a flowchart 900 of a method for processing data in an ALU with temporary registers in accordance with one embodiment of the present invention. Although specific steps are disclosed in flowchart 900, such steps are exemplary. That is, the present invention is well suited to performing various other steps or variations of the steps recited in flowchart 900. It is appreciated that the steps in flowchart 900 may be performed in an order different than presented and that the steps in flowchart 900 are not necessarily performed in the sequence illustrated. In one embodiment, flowchart 900 is implemented as program instructions executed by graphics processor 205 (FIGS. 2A and 2B).

In step 901 of FIG. 9, a first set of pixel data is received at a pipeline register coupled to the arithmetic circuitry of an ALU. The first set of pixel data is received from a stage that precedes the ALU in a graphics pipeline. The stage may be another ALU in the graphics pipeline. In one embodiment, the first set of pixel data corresponds to one part of a row of pixel data. In one such embodiment, the first set of pixel data is 20 bits in length. In another such embodiment, the row of pixel data includes a total of four sets of pixel data, each of which is received into a respective pipeline register coupled to the ALU.

In another embodiment, the first set of pixel data is associated with one row of a pixel packet for a first pixel. In such an embodiment, the first set of pixel data is identified as being associated with the first pixel using an indicator flag (e.g., an e/o bit).

In step 902, a first operation is performed by the ALU using the first set of pixel data. Examples of operations are listed in Table 1 above.

In step 903, a result of the first operation is written to a first temporary register within the ALU. In one embodiment, in which the first set of pixel data is associated with one row of a pixel packet for a first pixel, and in which the first set of pixel data is identified as being associated with the first pixel using an indicator flag (e.g., an e/o bit), the first temporary register is selected from a plurality of temporary registers according to the value of the indicator flag.

In step 904, a second set of pixel data is received into the pipeline register. In one embodiment, in which the first set of pixel data is associated with one row of a pixel packet for a first pixel, the second set of pixel data is associated with a second row of the pixel packet for the first pixel.

In step 905, the result of the first operation and the second set of pixel data is used by the ALU in a second operation.

In one embodiment, the first and second sets of pixel data are interleaved in the pipeline with a third set of pixel data and a fourth set of pixel data. In such an embodiment, the third and fourth sets of pixel data are associated with a first row and a second row of a pixel packet for a second pixel. The third set of pixel data is received into the pipeline register after the first set of pixel data but before the second set of pixel data. A third operation can be performed using the third set of pixel data, with the result written to a second temporary register that is selected from the plurality of temporary registers according to the value of the indicator flag. The result of the third operation can then be used in a subsequent fourth operation along with the fourth set of pixel data.

In summary, the use of ALU temporary registers in accordance with particular embodiments of the present invention allows a result generated using one set of pixel data to be used with a subsequent set of pixel data in the same ALU. The result can be persisted in the ALU through multiple clock cycles, until the subsequent set of pixel data is available at the ALU. Consequently, the occurrence of stalls that might otherwise occur in the ALU is avoided.

Embodiments of the present invention are thus described. While the present invention has been described in particular embodiments, it should be appreciated that the present invention should not be construed as limited by such embodiments, but rather construed according to the below claims.

What is claimed is:

1. An arithmetic logic unit stage for use in a graphics pipeline, said arithmetic logic unit stage comprising:
a plurality of scalar arithmetic logic units, each unit for performing a resultant arithmetic logic operation in the form of [a*b "op" c*d] on a set of input operands a, b, c and d and for producing a result based thereon, wherein "op" represents a programmable operation and wherein further said resultant arithmetic logic operation is software programmable to implement a plurality of different graphics functions, and wherein selection of said input operands and selection of said programmable operation for each scalar arithmetic logic unit are controlled by an instruction identifier in pixel data received by each scalar arithmetic logic unit, and each of said plurality of scalar arithmetic logic units is for determining whether to set a bit of said pixel data that will disable processing of said pixel data, wherein said determining comprises a comparison between a first subset of the input operands and a second subset of the input operands.

2. An arithmetic logic unit stage as described in claim 1 wherein said plurality of scalar arithmetic logic units operate on scalar values and not on vector values.

3. An arithmetic logic unit stage as described in claim 1 wherein said graphics pipeline comprises using fixed-point calculations.

4. An arithmetic logic stage unit stage as described in claim 1 wherein each scalar arithmetic logic unit is programmable by an instruction comprising:
an identification of a resultant arithmetic logic operation to be performed;
identifications of sources for said a, b, c and d; and
an identification of a destination for said result.

5. An arithmetic logic unit stage as described in claim 4 wherein, for each scalar arithmetic logic unit, said sources of said a, b, c and d are software selectable from a set comprising a pipeline register, a temporary register and a constant value register.

6. An arithmetic logic unit stage as described in claim 4 wherein, for each scalar arithmetic logic unit, said destination for said result is software programmable to be a temporary register and is further software programmable to be provided to a downstream pipeline unit.

7. An arithmetic logic unit stage as described in claim 1 wherein each scalar arithmetic logic unit comprises logic for formatting each input operand and wherein a first format negates said operand and wherein a second format performs (1−X) on said operand wherein X is said operand.

8. An arithmetic logic unit stage as described in claim 1 wherein said comparison comprises said first subset of the input operands is less than the second subset of the input operands.

9. An arithmetic logic unit stage as described in claim 1 wherein said comparison comprises said first subset of the input operands is equal to said second subset of the input operands.

10. An arithmetic logic unit stage as described in claim 1 wherein a pixel packet of a pixel comprises rows of pixel information and wherein each scalar arithmetic logic unit has a two clock cycle latency per row.

11. An arithmetic logic unit stage as described in claim 1 wherein pixel packets are associated with pixels and each pixel packet comprises a plurality of rows of pixel information and wherein each scalar arithmetic logic unit is software programmable to simultaneously process a different row of pixel information.

12. An arithmetic logic unit stage as described in claim 1 wherein pixel packets are associated with pixels and each pixel packet comprises a plurality of rows of pixel information and wherein said plurality of scalar arithmetic logic units is software programmable to simultaneously process rows of a plurality of pixels.

13. An arithmetic logic unit stage as described in claim 1 wherein first and second scalar arithmetic logic units are software programmable to operate simultaneously to implement a first graphics function while a third scalar arithmetic logic unit is software programmable to operate simultaneously to implement a second graphics function different from said first graphics function.

14. An arithmetic logic unit for graphics processing comprising:
   a graphics pipeline register for receiving incoming pixel data, said incoming pixel data comprising a plurality of scalar pixel attribute values and an identifier of a software programmable instruction for performing an arithmetic operation on a plurality of scalar operand values selected from said incoming pixel data;
   a first data selector for selecting said scalar operand values from said pipeline register based on said instruction identified by said identifier; and
   circuitry for performing said arithmetic operation applied to perform a plurality of graphics functions on said scalar operand values based on said instruction identified by said identifier to generate a result value;
   wherein said incoming pixel data comprises a bit that when set results in said incoming pixel data not being processed and said circuitry being powered downs wherein said arithmetic logic unit is for determining whether to set said bit, wherein said determining comprises a comparison between a first subset of the scalar operand values and a second subset of the scalar operand values.

15. The arithmetic logic unit as described in claim 14 wherein said first data selector selects four scalar operand values from said pipeline register.

16. The arithmetic logic unit as described in claim 15 wherein said circuitry performs two multiplication operations and one optional operation on said four scalar operand values.

17. The arithmetic logic unit as described in claim 14 wherein said comparison comprises said first subset of the scalar operand values is less than or equal to said second subset of the scalar operand values.

18. The arithmetic logic unit as described in claim 14 further comprising a clock-gating mechanism for disabling said arithmetic logic unit when the bit is set.

19. The arithmetic logic unit as described in claim 14 wherein said result value is sent to a downstream arithmetic logic unit coupled in series.

20. The arithmetic logic unit as described in claim 14 wherein said incoming pixel data is received from an upstream graphics pipeline stage.

21. The arithmetic logic unit as described in claim 20 wherein said upstream graphics pipeline stage is a data fetch stage.

22. The arithmetic logic unit as described in claim 14 wherein said result value is sent to a downstream graphics pipeline stage.

23. The arithmetic logic unit of claim 22 wherein said downstream graphics pipeline stage is a data write stage.

24. The arithmetic logic unit of claim 14 wherein said outgoing pixel data comprises said result value.

25. The arithmetic logic unit as described in claim 14 wherein said incoming pixel data is passed through said arithmetic logic unit without modification.

26. The arithmetic logic unit as described in claim 14 further comprising a temporary register and wherein said data selector further selects from which said scalar operands are selected.

27. The arithmetic logic unit as described in claim 14 further comprising a constant value register and wherein said data selector further selects from which said scalar operands are selected.

28. The arithmetic logic unit as described in claim 14 further comprising a second data selector for selecting at least one of a negative value and a complement value of an operand value based on said instruction.

29. A method for processing graphics data comprising:
   receiving a first set of pixel data, said first set of pixel data comprising payload information comprising a plurality of scalar pixel attribute values and sideband information comprising an identifier corresponding to a software programmable instruction for a first operation to be performed, said sideband information comprises a bit;
   selecting a set of operands to be processed at a first arithmetic logic unit;
   determining whether to set said bit, wherein said determining comprises performing a comparison between a first subset of the operands and a second subset of the operands;
   if said bit of said sideband information is not set, processing said first set of pixel data through an arithmetic logic unit stage comprising a plurality of series coupled scalar arithmetic logic units for processing said first set of pixel data based on said instruction corresponding to said identifier;
   if said bit of said sideband information is set, propagating said first set of pixel data through said arithmetic logic unit stage without said processing of said first set of pixel data based on said instruction corresponding to said identifier; and
   using said processed first set of pixel data to render an image on a display.

30. The method as described in claim 29 further comprising simultaneously performing a plurality of different operations on a pixel packet wherein said pixel packet is associated with a pixel and wherein said pixel packet comprises a plurality of rows of pixel information and wherein each of said arithmetic logic units is software programmable to simultaneously process a different row of pixel information.

31. The method as described in claim 29 further comprising:
   processing said operands and generating a result value; and
   sending said result value to a downstream arithmetic logic unit.

32. The method as described in claim 31 further comprising selecting a negative value or a complement value of an operand value.

33. The method as described in claim 31 further comprising clamping said result value.

34. The method as described in claim 29 further comprising:
   selecting a set of operands to be processed at a first arithmetic logic unit;
   processing said operands and generating a result value; and
   sending said result value to a temporary register accessible by said first arithmetic logic unit.

35. The method as described in claim 34 further comprising selecting at least one of a negative value and a complement value of an operand value.

36. The method as described in claim 34 further comprising clamping said result value.

37. The method as described in claim 29 wherein said arithmetic logic unit stage performs operations selected from a group consisting of: a fog operation; an alpha blend operation; an alpha test operation; and a texture combine operation.

38. The method as described in claim 29 wherein said arithmetic logic unit stage performs operations selected from said group further consisting of: a stencil operation; and a depth test operation.

39. The method as described in claim 29 wherein said comparison comprises the first subset of the operands is not equal to the second subset of the operands.

* * * * *